April 7, 1959

E. KRON 2,881,242

INSULATION SUPPORT FOR BUS-BARS

Filed July 8, 1953

INVENTOR.
Eugene Kron
BY
ATTORNEYS

April 7, 1959
E. KRON
2,881,242
INSULATION SUPPORT FOR BUS-BARS
Filed July 8, 1953
2 Sheets-Sheet 2
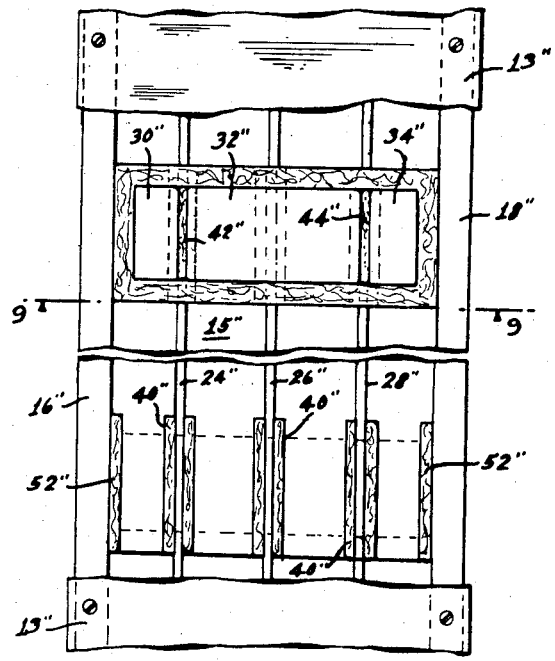
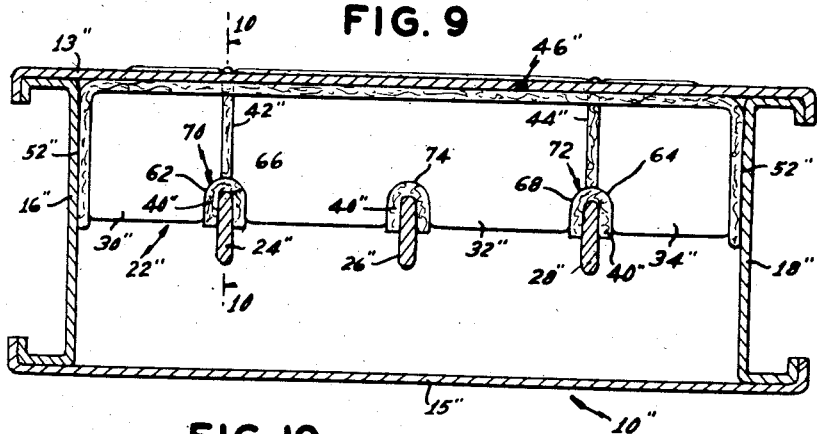
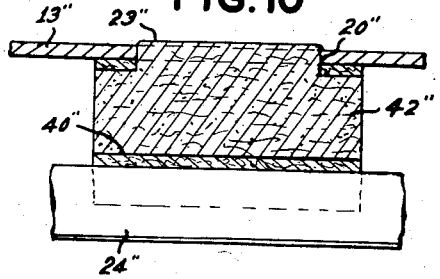
INVENTOR.
Eugene Kron
BY Edwin Levisohn &
Harry Cohen
ATTORNEYS United States Patent Office 2,881,242
Patented Apr. 7, 1959

2,881,242

INSULATION SUPPORT FOR BUS-BARS

Eugene Kron, Floral Park, N.Y., assignor to Federal Electric Products Company, Newark, N. J., a corporation of Delaware Application July 8, 1953, Serial No. 383,574

8 Claims. (Cl. 174—99)

This invention relates generally to bus bar supports and, more particularly, to insulation blocks for holding and supporting bus bars in a bus duct.

In the use of bus ducts of conventional construction, when the bus bars are subjected to currents of short circuit magnitude or other abnormal circuit conditions it sometimes occurs that stresses are developed between the bus bars so as to cause them to move in a lateral direction. With bus supports of conventional construction, in which said supports are arranged to secure the bus bars in a rigid condition or a substantial rigid condition, the aforenoted stresses tend to crack, break, or otherwise injure the supports, and it is accordingly the primary aim and object of the present invention to provide an insulation support of improved construction in which there is provision for limited lateral movement of the bus bars resulting from abnormal circuit conditions without damage to the support.

It is another object of the present invention to provide an insulation support of improved construction in which there is provision for limited lateral movement of the supports and the bus bars supported thereby under abnormal circuit conditions.

It is another object of the present invention to provide an insulation support for bus ducts of the aforedescribed character in which there is provided an improved shock absorbing arrangement between the support, the bus duct, and the bus bars supported thereby.

It is another object of the present invention to provide a bus duct having insulation supports of improved construction in which said supports may be fabricated of conventional low cost insulation material, such as porcelain and the like, and yet safely withstand abnormal circuit conditions of high magnitude without adverse affect.

It is yet another object of the present invention to provide a generally improved insulation support of the aforenoted character which is of simple design and construction, economical to manufacture, and highly efficient in the accomplishment of its intended purposes.

The above and other objects, features and advantages of the present invention will be more fully understood from the following description considered in connection with the accompanying illustrative drawings.

In the drawing which illustrates the best modes now contemplated by me for carrying out my invention:

Fig. 8 is a view similar to Fig. 1 showing a bus duct provided with another modified form of insulation support;

Fig. 9 is a sectional view, on an enlarged scale, taken on the line 9—9 of Fig. 8; and Fig. 10 is a sectional view taken on the line 10—10 of Fig. 9.

Figure 1:
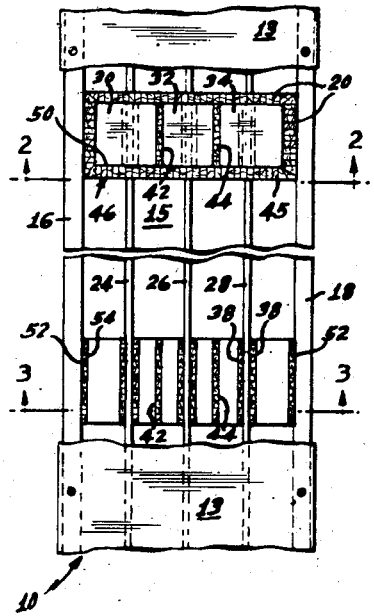
Fig. 1 is a view of a part of a bus duct with a portion of a side wall thereof broken away to reveal structural details.
Figure 2:
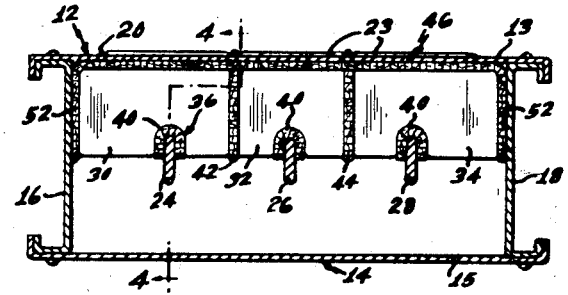
Fig. 2 is a sectional view, on an enlarged scale, taken on the line 2—2 of Fig. 1.
Figure 3:
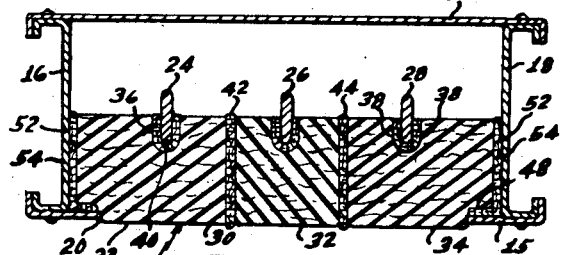
Fig. 3 is a sectional view, on an enlarged scale, taken on the line 3—3 of Fig. 1.

The insulation blocks or bus bar supports of the present invention are intended primarily for use in bus ducts, for example, in bus ducts of the construction shown in the patent to Cole et al. No. 2,306,353, issued December 22, 1952, or in other bus ducts.

Referring to the drawing in detail and more particularly to Figs. 1–4 thereof, there is shown a bus duct 10 which is generally of the construction shown and described in the aforereferred to patent, said bus duct being of the feeder type. The bus duct 10 is of elongated configuration and is defined by the opposed pair of longitudinally extending channels 12 and 14 and the opposed pair of longitudinally extending channels 16 and 18 which are interlocked to each other in a conventional manner. As described in the aforereferred to patent, the opposite side walls 13 and 15 of the channels 12 and 14, respectively, are provided with longitudinally spaced openings 20 which are adapted for cooperative association with the insulating supports 22 to be described in detail hereinafter. It is to be noted that the openings 20 in the opposed pair of walls 13 and 15, respectively are oppositely arranged whereby the supports 22 will be correspondingly oppositely arranged with adjacent supports facing in opposite directions. Disposed in the bus duct 10 are the longitudinally extending bus bars 24, 26 and 28 which are positioned in said duct in spaced relation to each other and to said duct.

The supports 22, which are spaced longitudinally of the bus duct 10, are adapted to hold the bus bars in properly spaced disposition relative to each other and to said duct. Each of the supports 22 is provided with a raised portion 23 which projects through and fits with a slight amount of clearance in its companion opening 20 in its associated wall of channels 12 and 14. Thus the raised portion 23 of each of the supports 22 engages a companion opening 20 and is thereby held in position in the duct 10. The support 22 comprises a plurality of companion insulating members 30, 32 and 34 which collectively define the support 22 which extends laterally of the duct 10. Each support 22 thus consists of the number of insulating members corresponding to the number of bus bars disposed in the duct 10. Thus each of the members 30, 32 and 34 is adapted to support a companion bus bar and, as aforenoted, said members collectively define the support 22. Each of the insulating members 30, 32 and 34 is slotted as indicated at 36 in a direction longitudinally of the bus duct and bus bars. Each of the slots 36 is dimensioned substantially larger than the thickness of the bus bars and the latter are adapted to be supported by a companion member in spaced relation therewith. Thus the space defined between the walls 38 of grooves or slots 36 is substantially greater than the thickness of the bus bars and disposed between the bus bars and said slots are cushioning strips 40 formed of any conventional shock absorbing material, such as felt or the like. Each of the cushioning strips is substantially U-shaped when in assembled condition and extends longitudinally of the duct 10, said strips being preferably of a thickness so as to be compressed by the bus bars when the latter are positioned in the grooves or slots 36 of the insulation members or blocks 30, 32 and 34. From the above, it will be apparent that the bus bars 24, 26 and 28 are in spaced relation with their companion insulating members 30, 32 and 34, respectively, and that there is provided a cushioning strip 40 between each of said bus bars and said insulation members.

Pursuant to the present invention, the supports 22 are formed of a plurality of companion insulating members as aforedescribed and said members are spaced from each other with the spaces defined therebetween preferably having shock absorbent material disposed therein in the manner now to be described. Disposed between the members 30 and 32 is a strip of shock absorbing material 42 and disposed between the members 32 and 34 is a strip of shock absorbing material 44, said strips 42 and 44 being substantially coextensive with the confronting faces of said members and disposed so as to extend longitudinally of the duct 10. Accordingly the strips 42 and 44 completely fill the spaces defined between the members 30, 32 and 34.

A cushioning or shock absorbing pad 46, which is preferably formed of felt, is positioned on the peripherally extending shoulder 48 defined by the members 30, 32 and 34 when assembled in supporting relation, said pad having a rectangular opening 50 in which the raised portion 23 of the support 22 fits. The pad 46 is preferably of the same width as support 22 but is longer than the latter so as to provide the projecting end portions 52 which are disposed between the members 30 and 34 and the channels 16 and 18, respectively. It will be noted that the portion 45 of the pad 46 which is seated on the shoulder 48 of the support 22 is disposed between the latter and the confronting inner surface portion of its associated wall of channels 12 and 14. It is also to be noted that the projecting portions 52 of the pad 46 are substantially coextensive with their adjacent confronting walls 54 of the members 30 and 34. Thus the projecting portions 52 are disposed between the members 30 and 34 and their confronting wall portions of the duct 10 and accordingly space said members from the duct. It will be apparent from the above that the members 30, 32 and 34, as well as being spaced from each other, are spaced from the duct 10 by means of the cushioning means aforedescribed. As aforenoted, the bus bars 24, 26 and 28 are supported at longitudinally spaced points of the duct 10 and the supports 22 are oppositely arranged relative to said duct whereby adjacent supports will be disposed in opposite directions. It will be apparent from the above that the bus bars which extend longitudinally in the bus duct are spaced from their companion insulation members of the supports 22 and that the latter are spaced from each other as well as being spaced from adjacent portions of said duct.

The aforedescribed arrangement provides for limited lateral movement of the bus bars and their companion supports under abnormal circuit conditions, it being apparent that stresses due to abnormal circuit conditions will be readily absorbed by the shock absorbing mounting of the insulating members which collectively define the laterally disposed supports 22. Accordingly the bus bars are not rigidly mounted relative to the supports 22 and the bus duct whereby stresses that would tend to crack, break, or otherwise injure the insulation members are absorbed by the shock absorbing arrangement aforedescribed. From the above, it will be apparent that the supports 22 may be formed of porcelain or other insulating material which is quite fragile in that excess mechanical stresses will be absorbed by the shock absorbing arrangement aforedescribed and will not be transmitted directly to the members comprising the supports 22. Thus the aforedescribed arrangement provides for the use of porcelain and the like materials which are non-carbonizing in that any abnormal circuit conditions of high magnitude will not adversely affect said supports since excess mechanical stresses will be absorbed.

Figure 5:
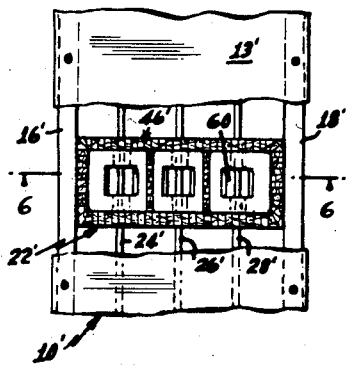
Fig. 5 is a view similar to Fig. 1 showing a bus duct provided with a modified form of insulation support.
Figure 4:
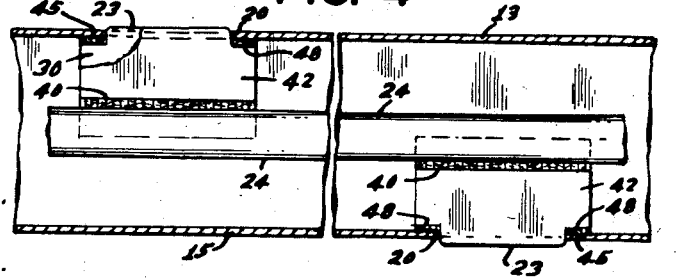
Fig. 4 is a sectional view taken on the line 4—4 of Fig. 2.
Figure 6:
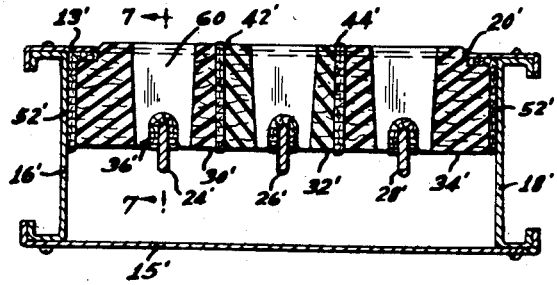
Fig. 6 is a sectional view, on an enlarged scale, taken on the line 6—6 of Fig. 5.
Figure 7:
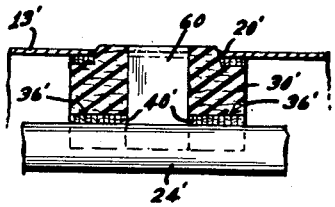
Fig. 7 is a sectional view taken on the line 7—7 of Fig. 6.

With reference to Figs. 5–7, there is shown a bus duct 10' which is structurally similar to the bus duct 10 aforedescribed except that bus duct 10' is of the plug-in type. It will be understood that the inventive concept aforedescribed is equally applicable to bus ducts of the plug-in type which are provided with plug-in openings as well as to the feeder type bus ducts which are not ordinarily provided with such plug-in openings. Accordingly the concept of the present invention is equally applicable to the feeder type of bus duct 10 aforedescribed and to the plug-in type of bus duct 10' now to be described. The bus duct 10' is structurally similar to the bus duct 10 aforedescribed except that bus duct 10' is provided with supports 22' which are provided with plug-in openings. Thus the supports 22' are structurally similar to the supports 22 aforedescribed except that the supports 22' are defined by the companion insulating members 30', 32', and 34' which are provided with plug-in openings 60. The plug-in recesses or openings 60 are accessible at the duct openings 20' and are adapted to expose portions of the buses for engagement with the contacts of a branch supply outlet device which is adapted for electrical and mechanical connection to the duct 10'. The plug-in openings 60 are similar to the corresponding openings fully shown and described in the aforereferred to patent and are adapted for a similar purpose as will be readily apparent. It will be noted that the plug-in recesses or openings 60 extend through the insulating members or blocks 30', 32', and 34' for exposing portions of the bus bars and that said recesses are in transverse alignment and are spaced corresponding to the spacing of the contacts of a conventional plug-in device. The slots 36' are structurally similar to the slots 36 aforedescribed and said slots 36' communicate with the plug-in openings or recesses 60. Each insulation member of the supports 22' is provided with a pair of slots 36' separated by openings 60 and accordingly each insulation member is provided with a pair of cushioning strips 40' disposed in said pair of slots for mounting the bus bars. Thus the supports 22' are similar to the supports 22 above-described except that supports 22' are provided with plug-in openings or recesses 60 which are adapted for the reception of the contacts of a bus duct plug-in device. Thus in the bus ducts 10 and 10' aforedescribed, the insulation supports 22, which are defined by the companion insulating members, provides a support arrangement for the bus bars in which there is provision for limited lateral movement of the supports and the bus bars supported thereby under abnormal circuit conditions whereby to provide an arrangement for absorbing excess mechanical stresses without damage to the insulating members. Thus the supports 22 aforedescribed may be formed of a non-carbonizing material, such as porcelain, which is relatively inexpensive and yet withstand without adverse effect the mechanical stresses produced by abnormal circuit conditions of high magnitude.

With reference to Figs. 8–10, there is shown a bus duct 10" which is structurally similar to the bus duct 10 aforedescribed and differs from said bus duct 10 in the respects now to be described. The bus duct 10" is provided with supports 22" which are similar to the supports 22 aforedescribed, said supports 22" being defined by companion insulating members 30", 32" and 34", said members being adapted to support the bus bars 24", 26" and 28" in properly spaced disposition relative to each other and to the duct 10". The end insulating members 30" and 34" are provided with slot portions 62 and 64, respectively, and the insulating member 32" disposed between said end insulating members has slot portions 66 and 68 which are formed complementary to the slot portions 62 and 64, respectively. The slot portions 62 and 66 collectively define the slot 70 which is adapted for the support of the bus bar 24", and similarly the slot portions 64 and 68 collectively define the slot 72 which is adapted to support the bus bar 28". The intermediate insulating member 32" of the support 22" is provided with a slot 74 which is adapted for the reception of the companion bus bar 26" in the manner aforedescribed relative to the bus duct 10. The bus bars 24", 26" and 28" are adapted to be supported in the slots or grooves 70, 74, and 72, respectively, in spaced relation with the insulating members in the manner aforedescribed. As described with reference to bus duct 10, the insulating members 30", 32" and 34" are spaced from each other and from the side walls 16" and 18" of duct 10" and each of such spacings has suitable shock absorbent material disposed therein whereby to provide for limited lateral movement of the bus bars resulting from abnormal circuit conditions in the manner above described. From the above it will be apparent that the supports 22" are similar to the supports 22 aforedescribed except that the slots 70 and 72 of supports 22" are defined by portions of adjacent insulating members whereby the intermediate insulating member 32" is substantially longer than the intermediate member 32 of the support 22. It is to be noted that the positioning of the bus bars in their companion grooves or slots of the insulating members of the supports 22, 22' and 22" is effective to hold said members of said supports in position against one of the opposite side walls 13 and 15 of its bus duct.

While I have shown and described the preferred embodiment of my invention, it will be understood that various changes may be made in the present invention without departing from the underlying idea or principles of the invention within the scope of the appended claims.

Having thus described my invention, what I claim and desire to secure by Letters Patent, is:

1. A bus bar assembly including a group of elongated wide and thin bus bars arranged with the edges thereof in a pair of spaced parallel planes and with the wide faces thereof in successive parallel planes, random pairs of said bus bars having an inherent tendency of being driven apart in the direction perpendicular to said wide faces by short-circuit stresses, and means for supporting and locating said bus bars in relation to each other and for resisting said stresses, said supporting and locating means including plural insulator assemblies extending across the opposite edges of said bus bars at longitudinally spaced positions along the bars, and said insulator assemblies being of the type wherein each insulator assembly abuts only one edge of each of the bus bars, certain of said insulator assemblies abutting the edges of the bars in only one of said planes while others of the insulator assemblies abut the edges of the bars in only the other of said parallel planes and metal means embracing and confining said insulator assemblies, each of said insulator assemblies filling the space between said embracing metal means in the direction perpendicular to the wide faces of the bus bars and including insulators of rigid material having formations therein which define recesses receiving and locating the respective edges of said bus bars, said supporting and locating means being thereby effective to resist the tendency of the bus bars to move apart, the formations in the insulators of each assembly against which the bus bars press in a separating direction in response to short-circuit stresses being provided on different ones of said insulators of rigid material of that assembly.

2. A bus bar assembly including a group of elongated wide and thin bus bars arranged with the edges thereof in a pair of spaced parallel planes and with the wide faces thereof in successive parallel planes, random pairs of said bus bars having an inherent tendency of being driven apart in the direction perpendicular to said wide faces by short-circuit stresses, and means for supporting and locating said bus bars and for resisting said stresses, said supporting and locating means including plural insulator assemblies extending across the edges of said bus bars at longitudinally spaced positions along the bars, and said insulator assemblies being of the type wherein each insulator assembly abuts only one edge of each of the bus bars, certain of said insulator assemblies abutting the edges of the bars in only one of said planes while others of the insulator assemblies abut the edges of the bars in only the other of said parallel planes and metal means embracing and confining said insulator assemblies, said insulator assemblies including insulators of rigid material having formations therein which define recesses receiving and locating the respective edges of said bus bars and shock absorbing material interposed between said insulators of rigid material, each of said insulator assemblies filling the space within said embracing means in the direction perpendicular to the wide faces of the bus bars, and said supporting and locating means being thereby effective to resist the tendency of the bus bars to move apart, the formations in the insulators of each assembly against which the bus bars press in a separating direction in response to short-circuit stresses being provided on different ones of said insulators of rigid material of that assembly.

3. A bus duct including a group of elongated wide and thin bus bars arranged with the edges thereof in a pair of spaced parallel planes and with the wide faces thereof in successive parallel planes, random pairs of said bus bars having an inherent tendency of being driven apart in the direction perpendicular to said wide faces by short-circuit stresses, and means for supporting and locating said bus bars and for resisting said stresses, said supporting and locating means including insulator assemblies extending across the edges of the bus bars at opposite sides of the bus bars and a metal duct of rectangular cross-section embracing and confining said insulator assemblies each of said insulator assemblies being of the type that extends only part way across the duct in the direction parallel to the wide faces of the bus bars and each insulator assembly abutting only those bus bar edges that are disposed in one of said planes, different ones of said insulator assemblies abutting opposite edges of said bus bars at longitudinally staggered positions along the duct, said insulator assemblies each including plural insulators of rigid material having formations therein which define recesses receiving and locating the edges of said bus bars, and each of said insulator assemblies filling the space within said duct in the direction perpendicular to the wide faces of the bus bars, said supporting and locating means being thereby effective to resist the tendency of the bus bars to move apart during short-circuits, the formations in the insulators of each assembly against which the bus bars press in a separating direction in response to short-circuit stresses being provided on different ones of said insulators of rigid material of that assembly.

4. A bus duct including a group of elongated wide and thin bus bars arranged with the edges thereof in a pair of spaced parallel planes and with the wide faces thereof in successive parallel planes, random pairs of said bus bars having an inherent tendency of being driven apart in the direction perpendicular to said wide faces by short-circuit stresses, and means for supporting and locating said bus bars and for resisting said stresses, said supporting and locating means including insulator assemblies extending across the edges of the bus bars at opposite sides of the bus bars and a metal duct of rectangular cross-section embracing and confining said insulator assemblies, said metal duct and said insulator assemblies having interengaging portions preventing relative longitudinal shifting thereof, each of said insulator assemblies being of the type that extends only part way across the duct in the direction parallel to the wide faces of the bus bars and each insulator assembly abutting only those bus bar edges that are disposed in one of said planes, different ones of said insulator assemblies abutting opposite edges of said bus bars at longitudinally staggered positions along the duct, said insulator assemblies each including plural insulators of rigid material and shock absorbing material between adjacent insulators and between said insulators and said metal duct and proportioned to fill the space within said duct in the direction perpendicular to the wide faces of the bus bars, said insulators of rigid material having formations therein which define recesses receiving and locating the edges of said bus bars, said supporting and locating means being thereby effective to resist the tendency of the bus bars to move apart during short-circuits, the formations in the insulators of each assembly against which the bus bars press in a separating direction in response to short-circuit stresses being provided on different ones of said insulators of rigid material of that assembly.

5. A bus duct including a group of elongated wide and thin bus bars arranged with the edges thereof in a pair of spaced parallel planes and with the wide faces thereof in successive parallel planes, random pairs of said bus bars having an inherent tendency of being driven apart in the direction perpendicular to said wide faces by short-circuit stresses, and means for supporting and locating said bus bars and for resisting said stresses, said supporting and locating means including insulator assemblies extending across the edges of the bus bars at opposite sides of the bus bars, and a metal duct of revtangular cross section embracing and confining said insulator assemblies, each of said insulator assemblies being of the type that extends only part way across the duct in the direction parallel to the wide faces of the bus bars and each insulator assembly abutting only those bus bar edges that are disposed in one of said planes, different ones of said insulator assemblies abutting opposite edges of said bus bars at longitudinally staggered positions along the duct, said insulator assemblies each including plural insulators of rigid material having formations therein which define recesses receiving and locating the edges of said bus bars, and said insulator assemblies filling the space within said duct in the direction perpendicular to the wide faces of the bus bars, said supporting and locating means being thereby effective to resist the tendency of the bus bars to move apart during short-circuits, the formations in each insulator assembly against which the bus bars press in a separating direction in response to short-circuit stresses being provided on different ones of said insulators of rigid material of that assembly, said metal duct having openings opposite the edges of the bus bars, the edges of which openings surround projecting portions of said insulators and thereby locate the insulators longitudinally with respect to the metal duct, said insulators having passages formed therein in alignment with the bus bars and with the openings in the metal duct for receiving the contacts of plug-in devices.

6. A bus duct including a group of elongated wide and thin bus bars arranged with the edges thereof in a pair of spaced parallel planes, and with the wide faces thereof in successive parallel planes, random pairs of said bus bars having an inherent tendency of being driven apart in the direction perpendicular to said wide faces by short-circuit stresses, and means for supporting and locating said bus bars and for resisting said stresses, said supporting and locating means including insulator assemblies extending across the edges of the bus bars at opposite sides of the bus bars and a metal duct of rectangular cross-section embracing and confining the insulator assemblies, said metal duct being provided with openings and said insulator assemblies being provided with projections extending into the duct openings and thereby providing interengagement preventing relative longitudinal shifting of the insulator assemblies along the bus duct, said insulators having passages formed therein transverse of the duct and the bus bars and in alignment with the edges of the bus bars and with the openings in the metal duct for admitting the contacts of a plug-in device, each of said insulator assemblies including insulators of porcelain disposed in a row and shock-absorbing material between each insulator and the next insulator of the row and between said insulators and said metal duct and proportioned to fill the space within said duct along the dimension perpendicular to the wide faces of the bus bars, said porcelain insulators having formations therein which define recesses receiving and locating the edges of said bus bars, said supporting and locating means being thereby effective to resist the tendency of the bus bars to move apart during short-circuits, the formations against which the different bus bars press in a separating direciton in response to short-circuit stresses being provided on different ones of said porcelain insulators.

7. A bus bar assembly including a group of elongated wide and thin bus bars arranged with the edges thereof in a pair of spaced parallel planes and with the wide faces thereof in successive parallel planes, random pairs of said bus bars having an inherent tendency of being driven apart in the direction perpendicular to said wide faces by short-circuit stresses, and means for supporting and locating said bus bars in relation to each other and for resisting said stresses, said supporting and locating means including plural insulator assemblies extending across the opposite edges of said bus bars at longitudinally spaced positions along the bars, and said insulator assemblies being of the type wherein each insulator assembly abuts the edges of the bus bars in only one of said planes, certain of said insulator assemblies abutting the edges of the bars in only one of said parallel planes, while others of said insulator assemblies abut the edges of the bars in only the other of said parallel planes, said insulators being staggered from edge to edge along the bars and the bus bar edges opposite each said insulator assembly being unobstructed and free of any insulating supporting and locating means, and metal means embracing and confining said insulator assemblies, each of said insulator assemblies filling the space within said embracing metal means in the direction perpendicular to the wide faces of the bus bars and including insulators of rigid material having formations therein which define recesses receiving and locating the respective edges of said bus bars, said supporting and locating means being thereby effective to resist the tendency of the bus bars to move apart, the formations in the insulators of each assembly against which the bus bars press in a separating direction in response to short-circuit stresses being provided on different ones of said insulators of rigid material of that assembly.

8. A bus bar assembly in accordance with claim 7 wherein each insulator assembly includes shock absorbing material interposed between said insulators of rigid material.

References Cited in the file of this patent

UNITED STATES PATENTS

| 2,306,353 | Cole | Dec. 22, 1942 |
| 2,341,841 | Carlson | Feb. 15, 1944 |
| 2,343,216 | Frank | Feb. 29, 1944 |
| 2,482,310 | Adam | Sept. 20, 1949 |
| 2,532,845 | Jensen | Dec. 5, 1950 |

OTHER REFERENCES

Publication I "Electrical Construction and Maintenance," March 1953, page 19. (Copy in Div. 69.)